(12) United States Patent
Gu et al.

(10) Patent No.: US 9,372,788 B2
(45) Date of Patent: Jun. 21, 2016

(54) STORAGE SYSTEM AND METHOD OF ADJUSTING SPARE MEMORY SPACE IN STORAGE SYSTEM

(71) Applicant: Samsung Electronics Co., Ltd., Suwon-si (KR)

(72) Inventors: Bon-Cheol Gu, Seongnam-si (KR); Ju-Pyung Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 44 days.

(21) Appl. No.: 14/143,125

(22) Filed: Dec. 30, 2013

(65) Prior Publication Data

US 2014/0189282 A1 Jul. 3, 2014

(30) Foreign Application Priority Data

Jan. 2, 2013 (KR) .................. 10-2013-0000300

(51) Int. Cl.
*G06F 12/02* (2006.01)
*G06F 3/06* (2006.01)

(52) U.S. Cl.
CPC ............ *G06F 12/023* (2013.01); *G06F 3/0616* (2013.01); *G06F 3/0644* (2013.01); *G06F 3/0688* (2013.01)

(58) Field of Classification Search
CPC .......................... G06F 12/0246; G06F 12/023
USPC ........................................................ 711/171
See application file for complete search history.

(56) References Cited

U.S. PATENT DOCUMENTS

| | | | | |
|---|---|---|---|---|
| 2010/0017557 | A1* | 1/2010 | Nakanishi et al. | 711/103 |
| 2010/0262765 | A1* | 10/2010 | Cheon et al. | 711/103 |
| 2011/0010488 | A1* | 1/2011 | Aszmann et al. | 711/103 |
| 2011/0099320 | A1* | 4/2011 | Lucas et al. | 711/103 |

FOREIGN PATENT DOCUMENTS

| | | |
|---|---|---|
| KR | 10-2005-0059984 A | 6/2005 |
| KR | 10-2006-0104310 A | 10/2006 |
| KR | 10-2009-0131224 A | 12/2009 |
| KR | 10-2010-0120990 A | 11/2010 |

* cited by examiner

*Primary Examiner* — Sanjiv Shah
*Assistant Examiner* — Mohamed Gebril
(74) *Attorney, Agent, or Firm* — Volentine & Whitt, PLLC

(57) ABSTRACT

A method includes determining a size of a recommended spare memory space of each of one or more storage nodes based on a state of the storage nodes, and adjusting a spare memory space of each of the storage nodes based on the size of the recommended spare memory space.

20 Claims, 12 Drawing Sheets

STORAGE SYSTEM AND METHOD OF ADJUSTING SPARE MEMORY SPACE IN STORAGE SYSTEM

CROSS-REFERENCE TO RELATED APPLICATION

This application claims the benefit under 35 USC 119(a) of Korean Patent Application No. 10-2013-0000300, filed on Jan. 2, 2013, in the Korean Intellectual Property Office, the entire disclosure of which is incorporated herein by reference for all purposes.

BACKGROUND

1. Field

The following description relates to a storage system and a method of adjusting a spare memory space in the storage system.

2. Description of Related Art

A method (over-provisioning method) includes using a part of a physical memory space as a spare memory space in a storage device, such as a flash memory, and using another part of the physical memory space as an available memory space in the storage device that can be actually used by a user. The spare memory space can help improve performance of the storage device and increase a life expectancy of the storage device.

For example, with respect to a flash memory, there are limitations on a number of writes and erases, and overwriting is impossible. Accordingly, when an overwriting request is received, data should be recorded after erasing data recorded in a corresponding page, and therefore, performance degradation may occur when a writing operation is continuously performed when there is a shortage of empty space.

Therefore, the spare memory space is ensured in advance, and when the overwriting request is received, data is recorded in the spare memory space, a logical memory address is updated, and unnecessary data is deleted later. This may improve the performance and increase the life expectancy by preventing writing and erasing operations from being concentrated on a specific block. Meanwhile, an effect may be increased by increasing a size of the spare memory space, but a size of the available memory space is reduced when the spare memory space is increased. Thus, there is a limitation on the size of the spare memory space.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes determining a size of a recommended spare memory space of each of one or more storage nodes based on a state of the storage nodes, and adjusting a spare memory space of each of the storage nodes based on the size of the recommended spare memory space.

The method may further include monitoring the state of the storage nodes.

The method may further include monitoring the state of the storage nodes based on a management policy.

The determining of the size of the recommended spare memory space may include determining the size of the recommended spare memory space of each of the storage nodes so that a size of an available memory space of the storage nodes is maintained constant.

The determining of the size of the recommended spare memory space may include determining the size of the recommended spare memory space of each of the storage nodes so that a size of an available memory space of the storage nodes is maintained at or above a minimum value.

The adjusting of the spare memory space may include monitoring a data storage state of each of the storage nodes and/or a size of a current spare memory space of each of the storage nodes, and allocating the spare memory space to each of the storage nodes based on the data storage state, or the size of the current spare memory space, or the size of the recommended spare memory space, or any combination thereof.

The allocating of the spare memory space may include, with respect to a storage node among the storage nodes allocating a space in which data is not stored in an available memory space as the spare memory space in response to the size of the current spare memory space being less than the size of the recommended spare memory space, and allocating a part of the current spare memory space as the available memory space in response to the size of the current spare memory space being greater than the size of the recommended spare memory space.

The allocating of the spare memory space may include, with respect to a storage node among the storage nodes allocating a space in which data is not stored in an available memory space as the spare memory space in response to a sum of the size of the current spare memory space and a size of the space in which data is not stored in the available memory space being less than the size of the recommended spare memory space, and allocating another space from which data was deleted in the available memory space as the spare memory space in response to the stored data being deleted from the other space.

The allocating of the spare memory space may include, with respect to a storage node among the storage nodes moving data stored in a part of an available memory space to another storage node in response to a sum of the size of the current spare memory space and a size of a space in which data is not stored in the available memory space being less than the size of the recommended spare memory space, and allocating the part of the available memory space from which the data was moved as the spare memory space.

In another general aspect, an apparatus includes a spare memory space determining unit configured to determine a size of a recommended spare memory space of each of one or more storage nodes based on a state of the storage nodes, and an adjustment node configured to adjust a spare memory space of each of the storage nodes based on the size of the recommended spare memory space.

The spare memory space determining unit may be further configured to monitor the state of the storage nodes.

The spare memory space determining unit may be further configured to monitor the state of the storage nodes based on a management policy.

The spare memory space determining unit may be configured to determine the size of the recommended spare memory space of each of the storage nodes so that a size of an available memory space of the storage nodes is maintained constant.

The spare memory space determining unit may be configured to determine the size of the recommended spare memory space of each of the storage nodes so that a size of an available memory space of the storage nodes is maintained at or above a minimum value.

The adjustment node may be configured to monitor a data storage state of each of the storage nodes and/or a size of a current spare memory space of each of the storage nodes, and allocate the spare memory space to each of the storage nodes based on the data storage state, or the size of the current spare memory space, or the size of the recommended spare memory space, or any combination thereof.

The adjustment node may be configured to, with respect to a storage node among the storage nodes allocate a space in which data is not stored in an available memory space as the spare memory space in response to the size of the current spare memory space being less than the size of the recommended spare memory space, and allocate a part of the current spare memory space as the available memory space in response to the size of the current spare memory space being greater than the size of the recommended spare memory space.

The adjustment node may be configured to, with respect to a storage node among the storage nodes allocate a space in which data is not stored in an available memory space as the spare memory space in response to a sum of the size of the current spare memory space and a size of the space in which data is not stored in the available memory space being less than the size of the recommended spare memory space, and allocate another space from which data was deleted in the available memory space as the spare memory space in response to the stored data being deleted from the other space.

The adjustment node may be configured to, with respect to a storage node among the storage nodes move data stored in a part of an available memory space to another storage node in response to a sum of the size of the current spare memory space and a size of a space in which data is not stored in the available memory space being less than the size of the recommended spare memory space, and allocate the part of the available memory space from which the data was moved as the spare memory space.

In still another general aspect, an apparatus includes a processor configured to determine a size of a spare memory of a storage node based on a state of one or more storage nodes, and adjust a current size of the spare memory based on the determined size.

The state of the storage nodes may include a latency of each of the storage nodes, or a current size of an available memory of each of the storage nodes, or a number of the storage nodes, or a wear rate of each of the storage nodes, or any combination thereof.

The processor may be configured to allocate a part of an available memory of the storage node in which data is not stored to the spare memory in response to the current size being less than the determined size, and allocate a part of the spare memory to the available memory in response to the current size being greater than the determined size.

Other features and aspects will be apparent from the following detailed description, the drawings, and the claims.

Figure 1:
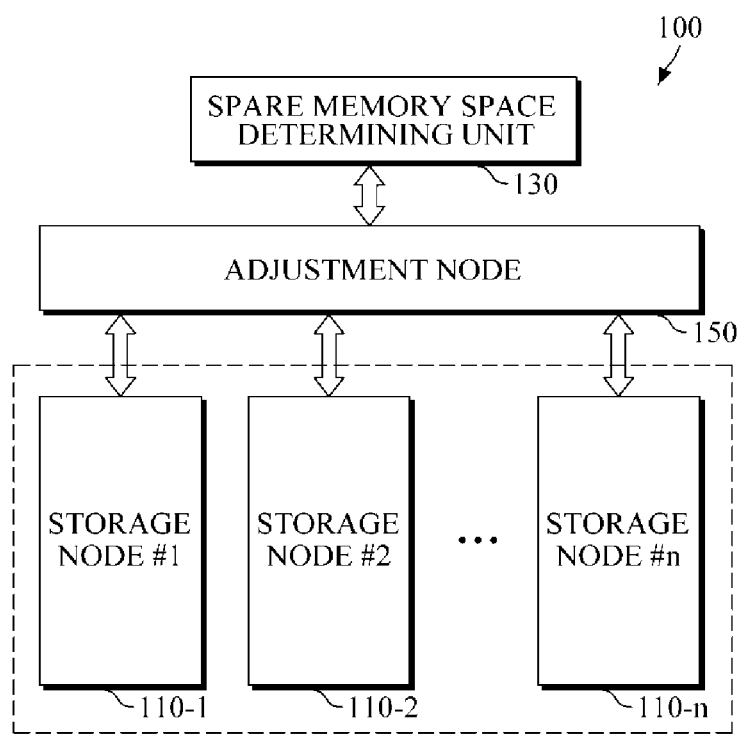
FIG. 1 is a diagram illustrating an example of a storage system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a storage system 100. Referring to FIG. 1, the storage system 100 includes one or more storage nodes 110, a spare memory space determining unit 130, and an adjustment node 150. The storage nodes 110 may include a storage node 110-1, a storage node 110-2, and a storage node 110-n.

Each of the storage nodes 110 is a storage medium that stores data. The storage medium may include a flash memory, a solid state disk (SSD), and/or each of at least one flash memory included in the SSD. In addition, each of the storage nodes 110 may be of a different type, and may include different performance or characteristics.

Meanwhile, the spare memory space determining unit 130 and the adjustment node 150 may be configured as a combination of hardware and software, such as a microprocessor, and need not be clearly separated in terms of their operations. The spare memory space determining unit 130, the adjustment node 150, and the storage nodes 110 may be included in a single device. Alternatively, the spare memory space determining unit 130, the adjustment node 150, and the storage node 110 may be configured as separate devices.

The spare memory space determining unit 130 determines a size of a recommended spare memory space of each of the storage nodes 110. The spare memory space determining unit 130 may monitor a data throughput of the entire storage system 100, a wear rate for each of the storage nodes, input/output operations per second (IOPS), a property of input/output data, a capacity, utilization, latency, whether bottlenecking occurs, and/or other information of the storage system 100 that are known to one of ordinary skill in the art.

For example, the spare memory space determining unit 130 may determine the size of the recommended spare memory space of each of the storage nodes 110 in accordance with a monitored state of the storage system 100. For example, when latency characteristics are poor based on the monitored state of the storage system 100, the size of the recommended spare memory space of each of the storage nodes 110 may be determined so as to increase the latency characteristics.

In another example, the spare memory space determining unit 130 may determine the size of the recommended spare memory space of each of the storage nodes 110 by monitoring the state of the storage system 100 in accordance with a system management policy. The system management policy may include wear management (standardization or differentiation), latency optimization of the storage system 100, an average data throughput, and/or other policies known to one of ordinary skill in the art, and may be set by a user.

In still another example, the spare memory space determining unit 130 may determine the size of the recommended spare memory space for each of the storage nodes 110 so that a size of an overall available memory space of the storage system 100 is maintained constant. In yet another example, the spare memory space determining unit 130 may determine the size of the recommended spare memory space for each of the storage nodes 110 so that the size of the overall available memory space of the storage system 100 is maintained at or above a minimum value. In this example, the minimum value of the overall available memory space of the storage system 100 may be variably determined in accordance with the system management policy and the monitored state of the storage system 100, or set in advance by the user.

The adjustment node 150 adjusts a spare memory space of each of the storage nodes 110 in accordance with the size of the recommended spare memory space that is determined in the spare memory space determining unit 130.

Figure 2:
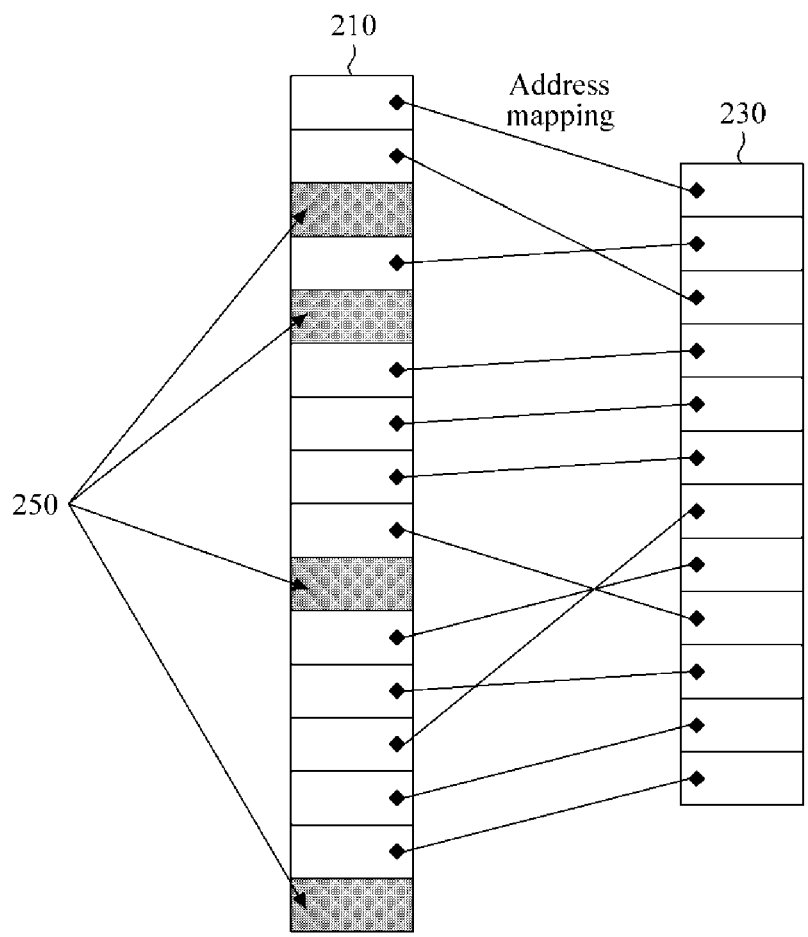
FIG. 2 is a diagram illustrating an example of a relationship between a logical memory space and a physical memory space in a storage system.

FIG. 2 is a diagram illustrating an example of a relationship between a logical memory space 230 and a physical memory space 210 in a storage system. Referring to FIG. 2, the physical memory space 210 is mapped to logical memory addresses of the logical memory space 230 that can be utilized in the outside, and a mapping relationship may be dynamically changed depending on the situation. For example, in an example of a storage node, such as an SSD, the physical memory space 210 may be mapped to the logical memory addresses in units of blocks or pages. In this example, a space in the physical memory space 210 that is mapped to a logical memory address may be an available memory space that can actually be used in the outside.

In the outside of the storage system, access to the storage system using a logical memory address may be possible. That is, when there is a request from the outside, such as reading, writing, or deleting of data, using the logical memory address, the request may be executed by converting the logical memory address into a physical memory address of the actual physical memory space 210. The conversion from the logical memory address to the physical memory address may be performed using an address conversion algorithm, such as a flash translation layer (FTL). Meanwhile, a space in the physical memory space 210 that is not mapped to a logical memory address may be a spare memory space 250 that cannot be used in the outside.

Figure 3A:
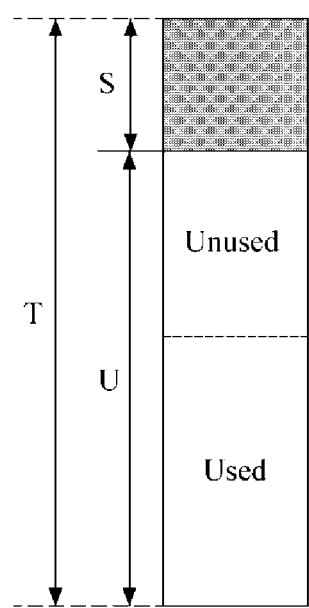
FIGS. 3A and 3B are diagrams illustrating an example of storage nodes and a memory space of a storage system.
Figure 3B:
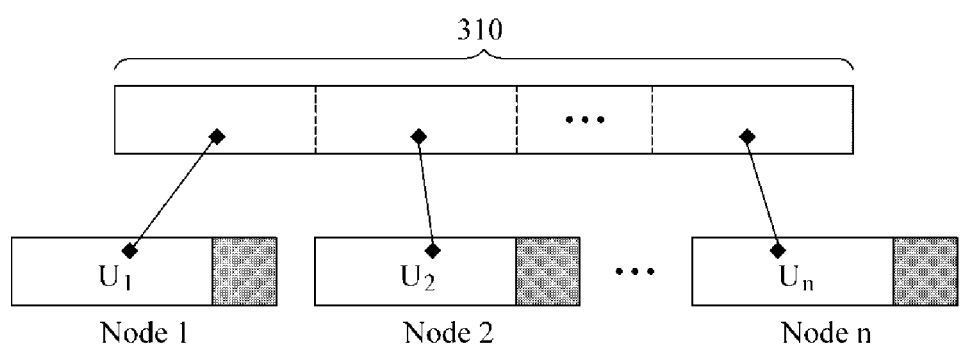

FIGS. 3A and 3B are diagrams illustrating an example of storage nodes and a memory space of a storage system. Referring to FIGS. 3A and 3B, a size of an available memory space U of each of the storage nodes is less than or equal to a size of a physical memory space T of each of the storage nodes. A difference in size between the physical memory space T and the available memory space U is a size of a spare memory space S of each of the storage nodes.

In this example, the physical memory space T refers to an actual memory space of each of the storage nodes, and the available memory space U refers to a memory space that can be used in an external file system within the physical memory space T. In addition, the available memory space U may be separated into a used space in which data is stored and an unused space in which data is not stored. A ratio (S/U) of the available memory space U and the spare memory space S in each of the storage nodes may be referred to as a spare factor.

Referring to FIG. 3B, an overall physical memory space of the storage system is a sum of physical memory spaces of the overall storage nodes included in the storage system 100. An available memory space 310 of the entire storage system is a sum of available memory spaces $U_1$ to $U_n$ of respective storage nodes 1 to n.

Figure 4A:
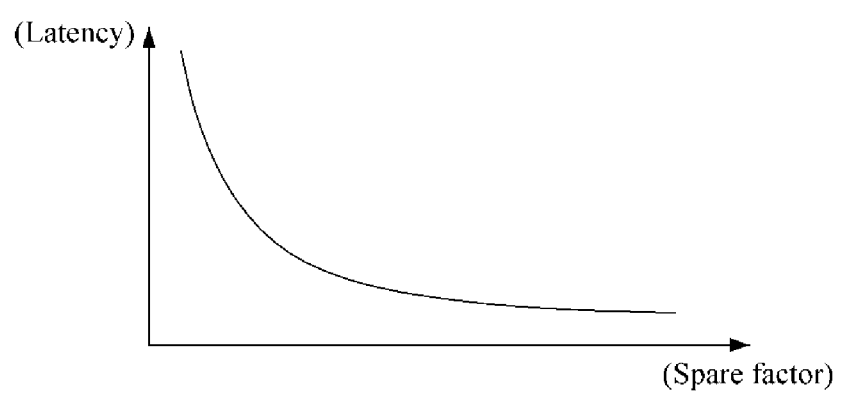
FIGS. 4A and 4B are diagrams illustrating an example of a determination of a recommended spare memory space of a storage node.
Figure 4B:
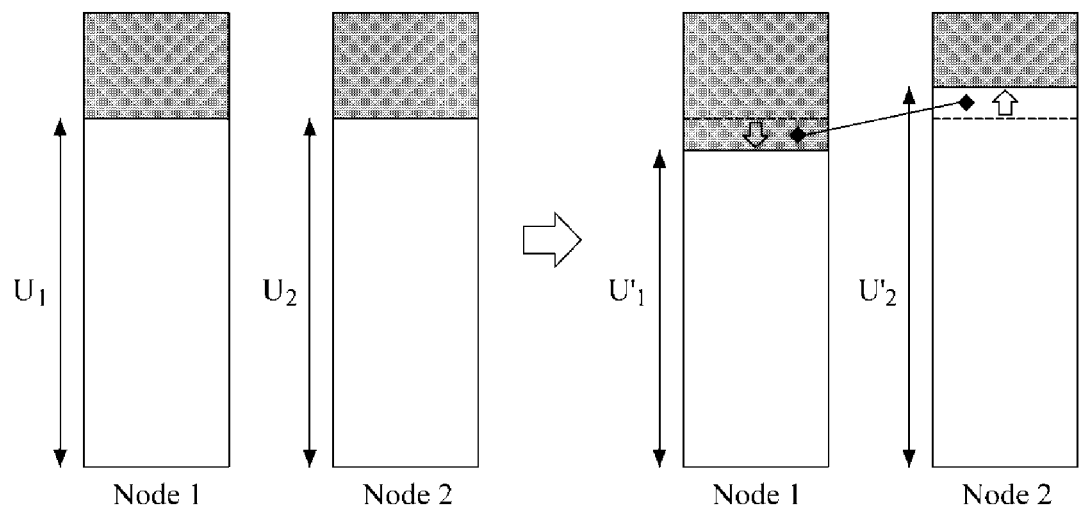

FIGS. 4A and 4B are diagrams illustrating examples of a determination of a recommended spare memory space of a storage node. FIG. 4A is a graph showing latency characteristics in accordance with a spare factor of the storage node.

Referring to FIG. 4A, when latency characteristics are poor based on a monitored state of a storage system, or when a system management policy is set as latency optimization, a size of a spare memory space of each of the storage nodes may be determined so that the latency characteristics of the storage system can be optimized. As shown in the graph, characteristic information of each of the storage nodes may be collected in advance and stored, and the spare memory space determining unit 130 of FIG. 1 may use the characteristic information of each of the storage nodes when determining the spare memory space of each of the storage nodes.

For example, referring to the shown graph, a horizontal axis of the graph indicates the spare factor of the storage node, and a vertical axis thereof indicates the latency characteristics of the storage node according to the spare factor. In the shown example, the latency characteristics of the storage node may be inversely proportional to the spare factor of the storage node or the size of the spare memory space. From the latency characteristics of the storage node, the spare memory space determining unit 130 may calculate a size of the recommended spare memory space for the storage node so as to minimize the latency characteristics.

The following example of Equation 1 shows a function between a spare factor and a latency of an i-th storage node:

$$\text{Latency}_i = N_i(S_i) \qquad (1)$$

In Equation 1, $S_i$ denotes the spare factor of the i-th storage node.

An objective function of optimizing a latency of the entire storage system may be represented as the following example of Equation 2:

$$f = \frac{\sum_{i=1}^{n} \text{Latency}_i}{n} \qquad (2)$$

In Equation 2, n denotes a number of storage nodes, and the size of the recommended spare memory space of each of the storage nodes may be determined from the space factor $S_i$ of the i-th storage node that can minimize the objective function f.

Meanwhile, Equations 1 and 2 are merely examples to describe the determination of the spare memory space of the storage node, and therefore, the example of FIGS. 4A and 4B is not limited to Equations 1 and 2. That is, Equations 1 and 2 may be changed in various forms in accordance with the system management policy and/or characteristics of each of the storage nodes.

For example, when a storage node includes a relatively high wear rate based on the monitored state of the storage system, the spare memory space determining unit 130 may determine a spare factor of each of the storage nodes considering accelerated wear characteristics due to the spare factor of each of the storage nodes. As another example, when the system management policy is set as wear rate differentiation, minimization, and equalization, the spare memory space determining unit 130 may monitor a current wear state of each of the storage nodes, and determine the spare factor of each of the storage nodes considering the accelerated wear characteristics due to the spare factor of each of the storage nodes. Meanwhile, the system management policy may be set as minimizing the wear rate while simultaneously minimizing the latency.

In still another example, the spare memory space determining unit 130 may determine the size of the spare memory space of each of the storage nodes so that a size of an available memory space of the entire storage system is maintained constant. Referring to FIG. 4B, when a size of a spare memory space of a storage node is increased, the size of the available memory space of the entire storage system is maintained constant by reducing the size of the spare memory spaces of the remaining storage nodes excluding the storage node by an increment in the spare memory space of the storage node.

In the shown example, a size of a spare memory space $U_1$ of a storage node 1 is increased to $U'_1$. The size of the overall available memory space before adjusting the spare memory space $U_1$ can be maintained constant by reducing a size a spare memory space $U_2$ of a storage node 2 by an increment in the spare memory space $U_1$ of the storage node 1, to $U'_2$. That is, the size of the spare memory space of each of the storage nodes 1 and 2 are determined so as to satisfy $U_1+U_2=U'_1+U'_2$, and therefore, the size of the available memory space of the entire storage system can be maintained constant.

Meanwhile, in the shown example, the adjustment of the spare memory spaces between the two storage nodes is shown, but the example is not limited to this. For example, by reducing spare memory spaces of at least two storage nodes by an increment in a spare memory space of a single storage node, the size of the available memory space of the entire storage system may be maintained constant.

In yet another example, the spare memory space determining unit 130 may determine the spare memory space of each of the storage nodes so that the size of the overall available memory space of the storage system may be maintained at or above a minimum value. The minimum value of the size of the overall available memory space of the storage system may be determined in accordance with the system management policy and the monitored state of the storage system, or set in advance by a user. Meanwhile, the size of the spare memory space of each of the storage nodes may be flexibly adjusted while maintaining the size of the overall available memory space of the storage system constant or at or above the minimum value, and therefore, performance of the entire storage system may be improved while delicately adjusting standards of performance for each of the storage nodes.

Figure 5A:
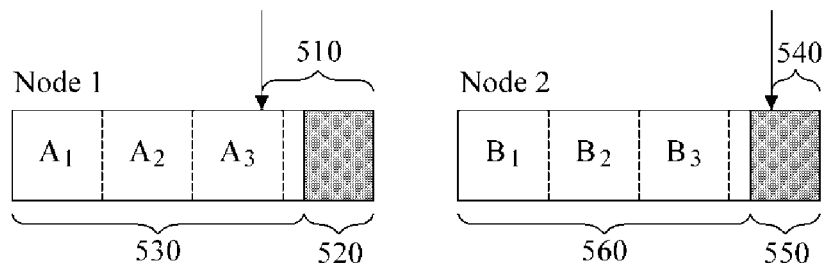
FIGS. 5A to 5C are diagrams illustrating respective examples of an adjustment of a spare memory space of a storage node.
Figure 5B:
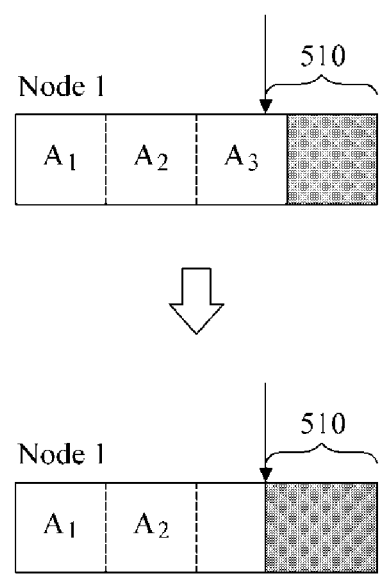
Figure 5C:
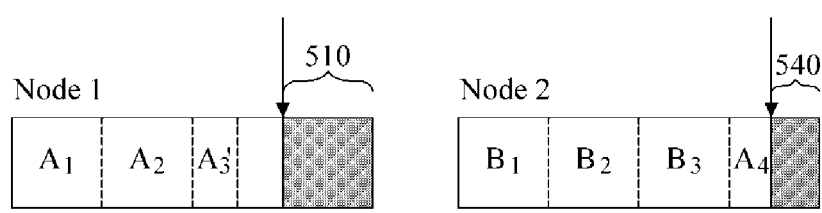

FIGS. 5A to 5C are diagrams illustrating respective examples of an adjustment of a spare memory space of a storage node. The adjustment node 150 of FIG. 1 adjusts a spare memory space of each of storage nodes in accordance with a size of a recommended spare memory space that is determined in the spare memory space determining unit 130 of FIG. 1. In more detail, the adjustment node 150 may adjust the spare memory space of each of the storage nodes in accordance with the size of the recommended spare memory space by monitoring a size of a current spare memory space of each of the storage nodes and/or a data storage state.

For example, when the size of the current spare memory space of the storage node is less than the size of the recommended spare memory space, a space in which data is not stored in an available memory space may be allocated to the spare memory space. When the size of the current spare memory space is greater than the size of the recommended spare memory space, a part of the current spare memory space may be allocated to the available memory space.

In another example, when a sum of the size of the current spare memory space of the storage node and the space in which data is not stored in the available memory space is less than the size of the recommended spare memory space, the space in which data is not stored in the available memory space may be allocated to the spare memory space. When the stored data is deleted from the available memory space, the spare memory space may be additionally allocated.

Referring to FIG. 5A, with respect to a storage node 1, a size of a recommended spare memory space 510 is greater than a size of a current spare memory space 520, and therefore, the size of the current spare memory space 520 is increased so as to ensure the recommended spare memory space. Meanwhile, in an available memory space 530 of the storage node 1, there are areas in which data is stored and in which data is not stored. With respect to the storage node 2, a size of a recommended spare memory space 540 is less than a size of a current spare memory space 550, and therefore, the size of the current spare memory space 550 is reduced. In addition, in an available memory space 560 of the storage node 2, there are areas in which data is stored and in which data is not stored in the same manner as in the storage node 1.

With respect to the storage node 2, since the size of the recommended spare memory space 540 is less than the size of the current spare memory space 550, the recommended spare memory space 540 is immediately applied by allocating a part of the current spare memory space 550 as the available memory space. On the other hand, with respect to the storage node 1, since the size of the recommended spare memory space 510 is greater than the size of the current spare memory space 520, it is necessary to allocate a part of the available memory space 530 as the spare memory space.

However, even when spaces in which data is not stored in the available memory space 530 are all allocated as the spare memory space, the size of the recommended spare memory space 510 may not be ensured. In this example, when the spaces in which data is not stored in the available memory space of the storage node 1 are allocated as the spare memory space as shown in FIG. 5B, and then data (e.g., $A_3$) stored in a part of the available memory space is deleted, the spare memory space is additionally allocated with the part of the available memory space, thereby ensuring the recommended spare memory space 510.

In another example, when the recommended spare memory space 510 needs be immediately ensured in the storage node 1 as shown in FIG. 5C, data A4 in a part of the available memory space of the storage node 1 that is needed to allocate the spare memory space is moved to the storage node 2, thereby ensuring the recommended spare memory space 510.

In this example, data may be moved to at least one storage node (e.g., the storage node 2) whose spare memory space is reduced.

Figure 6:
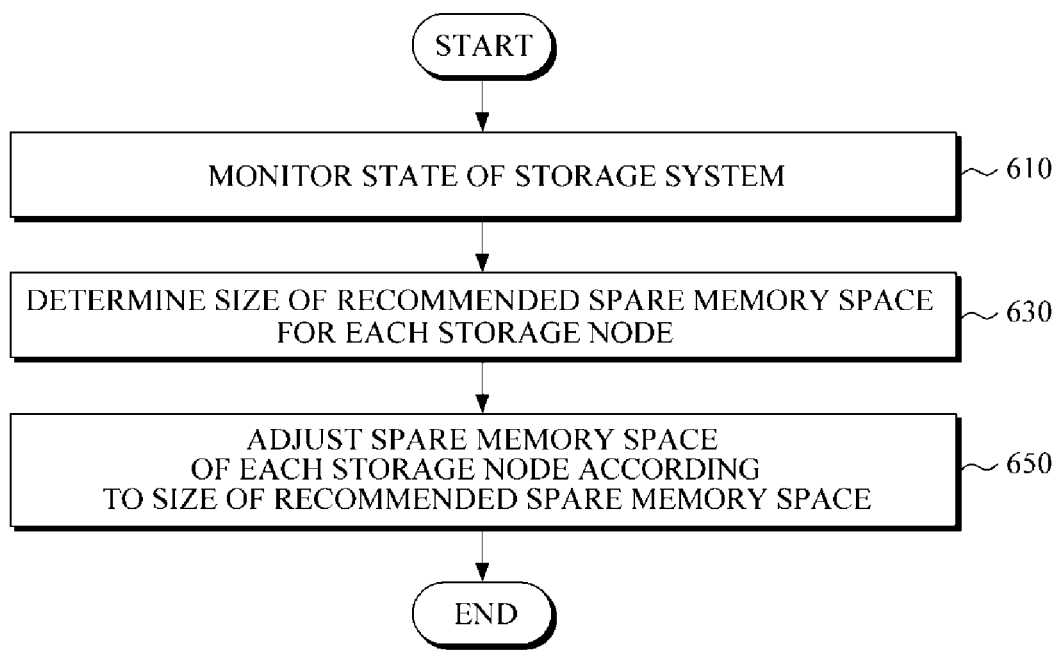
FIG. 6 is a flowchart illustrating an example of a method of adjusting a spare memory space of a storage system.

FIG. 6 is a flowchart illustrating an example of a method of adjusting a spare memory space of a storage system. Referring to FIG. 6, in operation 610, the spare memory space determining unit 130 of FIG. 1 monitors a state of the storage system 100 of FIG. 1 in order to determine a size of a recommended spare memory space of each of the storage nodes 110 of FIG. 1.

In operation 630, the spare memory space determining unit 130 determines the size of the recommended spare memory space of each of the storage nodes 110 in accordance with the monitored state of the storage system 100. For example, when a system management policy is set, the spare memory space determining unit 130 may determine the size of the recommended spare memory space of each of the storage nodes 110 by monitoring each of the storage nodes 110 in accordance with the system management policy. The system management policy may be set in advance by a user.

In another example, the spare memory space determining unit 130 may determine the size of the recommended spare memory space of each of the storage nodes 110 so that a size of an overall available memory space of the storage system 100 is maintained constant. In still another example, the spare memory space determining unit 130 may determine the size of the recommended spare memory space of each of the storage nodes 110 so that the size of the overall available memory space of the storage system 100 is maintained at or above a minimum value.

In operation 650, the adjustment node 150 of FIG. 1 adjusts a spare memory space of each of the storage nodes 110 in accordance with the determined size of the recommended spare memory space.

Figure 7:
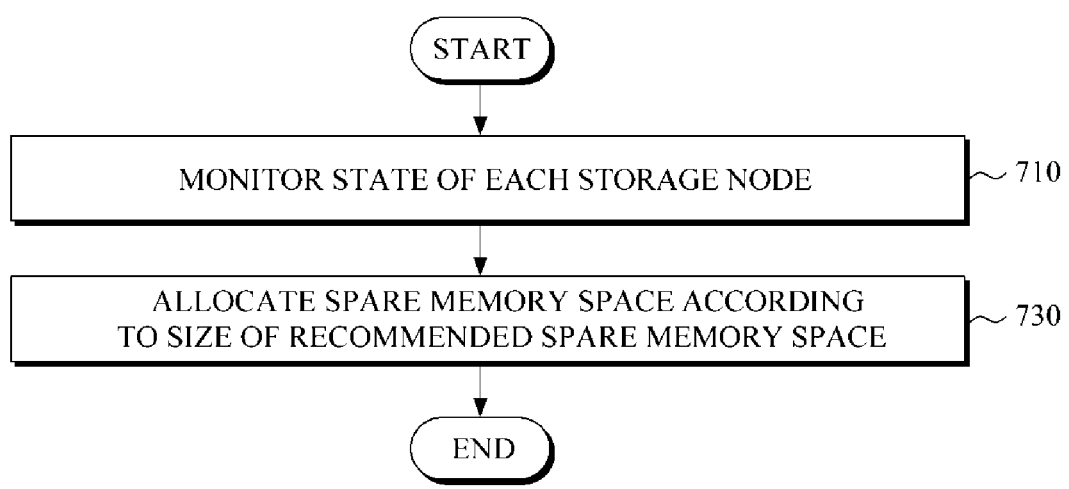
FIGS. 7 and 8 are flowcharts illustrating respective examples of a method of applying a recommended spare memory space of a storage node.
Figure 8:
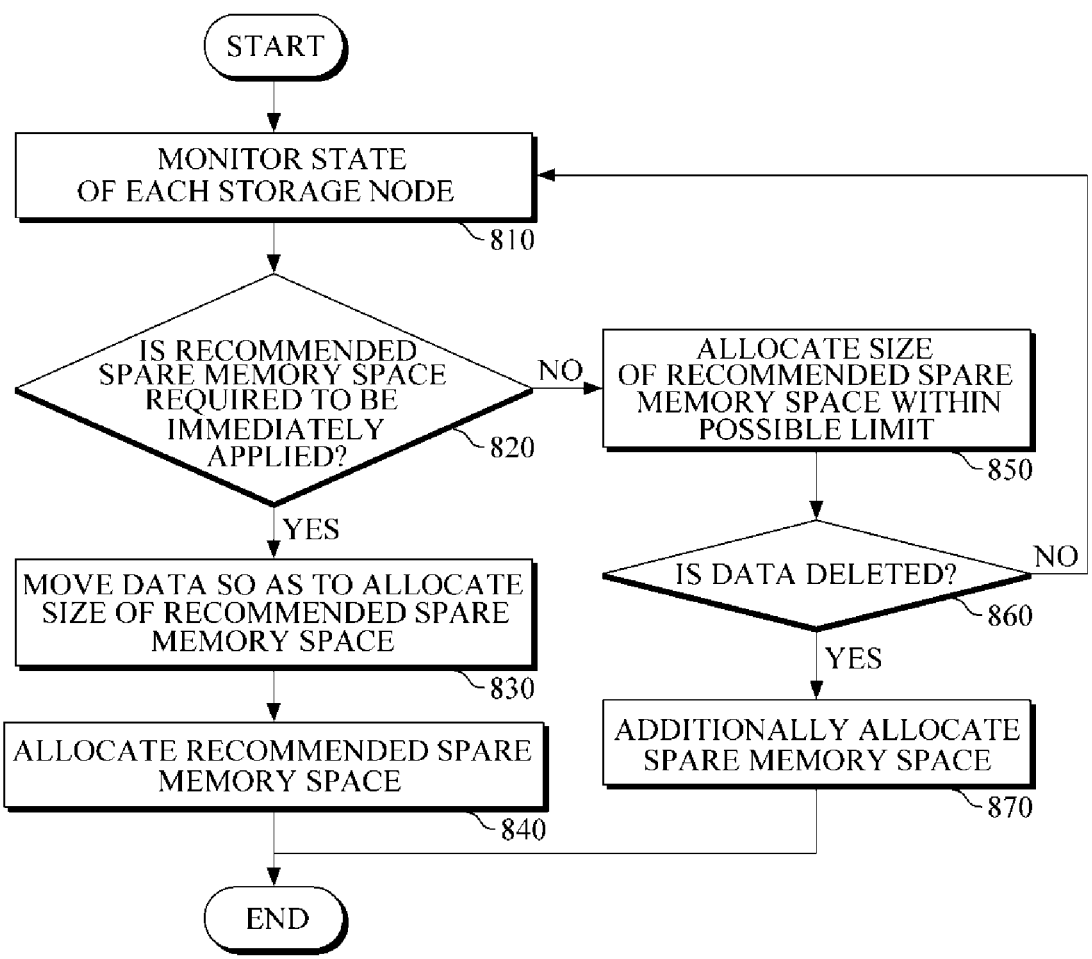

FIGS. 7 and 8 are flowcharts illustrating respective examples of a method of applying a recommended spare memory space of a storage node. Referring to FIG. 7, in operation 710, the adjustment node 150 of FIG. 1 monitors a state of each of the storage nodes 110 of FIG. 1, e.g., a data storage state of each of the storage nodes 110 and a size of a current spare memory space of each of the storage nodes 110.

In operation 730, when a determined size of a recommended spare memory space of each of the storage nodes 110 is applicable to a storage node among the storage nodes 110, the adjustment node 150 allocates a spare memory space to the storage node in accordance with the determined size of the recommended spare memory space. In more detail, when the size of the current spare memory space of the storage node is less than the size of the recommended spare memory space, a space in which data is not stored in the available memory space may be additionally allocated as the spare memory space. When the size of the current spare memory space is greater than the size of the recommended spare memory space, a part of the current spare memory space may be additionally allocated as the available memory space.

In another example, referring to FIG. 8, in operation 810, the adjustment node 150 of FIG. 1 monitors a state of each of the storage nodes 110 of FIG. 1, e.g., a data storage state of each of the storage nodes 110 and a size of a current spare memory space of each of the storage nodes 110.

In operation 820, the adjustment node 150 determines whether a determined size of a recommended spare memory space of each of the storage nodes 110 is required to be immediately applied. Whether the determined size of the recommended spare memory space is required to be immediately applied may be determined considering a system management policy and/or the monitored state of the storage system. When the determined size of the recommended spare memory space of each of the storage nodes 110 is determined to be required to be immediately applied, the method continues in operation 830. Otherwise, the method continues in operation 850.

In operation 830, when a sum of the size of the current spare memory space of a storage node, among the storage nodes 110, and a space in which data is not stored in an available memory space of the storage node is less than the size of the recommended spare memory space, the adjustment node 150 moves data stored in a part of the available memory space to another storage node so as to allocate the size of the recommended spare memory space.

In operation 840, the adjustment node 150 allocates the part of the available memory space from which the data was moved as the spare memory space to allocate the recommended spare memory space.

In operation 850, when a sum of the size of the current spare memory space of the storage node and the space in which data is not stored in the available memory space is less than the size of the recommended spare memory space, the adjustment node 150 allocates the space in which data is not stored in the available memory space as the spare memory space to allocate the size of the recommended spare memory space within a possible limit.

In operation 860, the adjustment node 150 determines whether data stored in another space of the available memory space is deleted. If the data stored in the other space of the available memory space is determined to be deleted, the method continues in operation 870. Otherwise, the method returns to operation 810.

In operation 870, the adjustment node 150 additionally allocates the spare memory space with the other space of the available memory space from which the data was deleted.

The various units, nodes, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein. Flash memory devices and/or memory controllers may be packaged in packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Wafer Form, Chip on Board (COB), Ceramic Dual In-Line Package (CERDIP), Metric Quad Flat Package (MQFP), Thin Quad Flat Package (TQFP), Quad Flat Package (QFP), Small Outline Integrated Circuit (SOIC), Shrink Small Outline Package (SSOP), Thin Small Outline Package (TSOP), System in Package (SiP), Multi-Chip Package (MCP), Wafer-Level Fabricated Package (WFP), Wafer-Level-Processed Stack Package (WSP), and any other suitable package that is known to one of ordinary skill in the art.

The flash memory devices and/or the memory controllers may constitute memory cards. In this case, the memory controllers may be configured to communicate with an external device, such as a host computer, using an interface protocol such as Universal Serial Bus (USB), MultiMediaCard (MMC), Peripheral Component Interconnect Express (PCIe), Serial Advanced Technology Attachment (ATA) (SATA), Parallel ATA (PATA), Small Computer System Interface (SCSI), Enhanced Small Device Interface (ESDI), Integrated Drive Electronics (IDE), or any other interface protocol that is known to one of ordinary skill in the art.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method comprising:
 determining a size of a recommended spare memory space of each of one or more storage nodes based on a state of the storage nodes; and
 adjusting a spare memory space of each of the storage nodes based on the size of the recommended spare memory space,
 wherein the determining the size of the recommended spare memory space of each of the one or more storage nodes is calculated using the following equation:

$$f = \frac{\sum_{i=1}^{n} \text{Latency}_i}{n} \quad (2)$$

where $\text{Latency}_i$ denotes a function of latency time and is inversely proportional to a spare factor $S_i$ of an i-th storage node, f denotes an objective function and n denotes a number of the storage nodes.

2. The method of claim 1, further comprising:
monitoring the state of the storage nodes.

3. The method of claim 1, further comprising:
monitoring the state of the storage nodes based on a management policy.

4. The method of claim 1, wherein the determining of the size of the recommended spare memory space comprises:
determining the size of the recommended spare memory space of each of the storage nodes so that a size of an available memory space of the storage nodes is maintained constant.

5. The method of claim 1, wherein the determining of the size of the recommended spare memory space comprises:
determining the size of the recommended spare memory space of each of the storage nodes so that a size of an available memory space of the storage nodes is maintained at or above a minimum value.

6. The method of claim 1, wherein the adjusting of the spare memory space comprises:
monitoring a data storage state of each of the storage nodes and/or a size of a current spare memory space of each of the storage nodes; and
allocating the spare memory space to each of the storage nodes based on the data storage state, or the size of the current spare memory space, or the size of the recommended spare memory space, or any combination thereof.

7. The method of claim 6, wherein the allocating of the spare memory space comprises, with respect to a storage node among the storage nodes:
allocating a space in which data is not stored in an available memory space as the spare memory space in response to the size of the current spare memory space being less than the size of the recommended spare memory space; and
allocating a part of the current spare memory space as the available memory space in response to the size of the current spare memory space being greater than the size of the recommended spare memory space.

8. The method of claim 6, wherein the allocating of the spare memory space comprises, with respect to a storage node among the storage nodes:
allocating a space in which data is not stored in an available memory space as the spare memory space in response to a sum of the size of the current spare memory space and a size of the space in which data is not stored in the available memory space being less than the size of the recommended spare memory space; and
allocating another space from which data was deleted in the available memory space as the spare memory space in response to a stored data being deleted from the available memory space.

9. The method of claim 6, wherein the allocating of the spare memory space comprises, with respect to a storage node among the storage nodes:
moving data stored in a part of an available memory space to another storage node in response to a sum of the size of the current spare memory space and a size of a space in which data is not stored in the available memory space being less than the size of the recommended spare memory space; and
allocating the part of the available memory space from which the data was moved as the spare memory space.

10. An apparatus comprising:
a spare memory space determining unit configured to determine a size of a recommended spare memory space of each of one or more storage nodes based on a state of the storage nodes; and
an adjustment node configured to adjust a spare memory space of each of the storage nodes based on the size of the recommended spare memory space,
wherein the spare memory space determining unit is configured to calculate the size of the recommended spare memory space of each of one or more storage nodes using the following equation:

$$f = \frac{\sum_{i=1}^{n} \text{Latency}_i}{n} \quad (2)$$

where $\text{Latency}_i$ denotes a function of latency time and is inversely proportional to a spare factor $S_i$ of an i-th storage node, f denotes an objective function and n denotes a number of the storage nodes.

11. The apparatus of claim 10, wherein the spare memory space determining unit is further configured to:
monitor the state of the storage nodes.

12. The apparatus of claim 10, wherein the spare memory space determining unit is further configured to:
monitor the state of the storage nodes based on a management policy.

13. The apparatus of claim 10, wherein the spare memory space determining unit is configured to:
determine the size of the recommended spare memory space of each of the storage nodes so that a size of an available memory space of the storage nodes is maintained constant.

14. The apparatus of claim 10, wherein the spare memory space determining unit is configured to:
determine the size of the recommended spare memory space of each of the storage nodes so that a size of an available memory space of the storage nodes is maintained at or above a minimum value.

15. The apparatus of claim 10, wherein the adjustment node is configured to:
monitor a data storage state of each of the storage nodes and/or a size of a current spare memory space of each of the storage nodes; and
allocate the spare memory space to each of the storage nodes based on the data storage state, or the size of the current spare memory space, or the size of the recommended spare memory space, or any combination thereof.

16. The apparatus of claim 15, wherein the adjustment node is configured to, with respect to a storage node among the storage nodes:
allocate a space in which data is not stored in an available memory space as the spare memory space in response to the size of the current spare memory space being less than the size of the recommended spare memory space; and allocate a part of the current spare memory space as the available memory space in response to the size of the current spare memory space being greater than the size of the recommended spare memory space.

17. The apparatus of claim 15, wherein the adjustment node is configured to, with respect to a storage node among the storage nodes:
 allocate a space in which data is not stored in an available memory space as the spare memory space in response to a sum of the size of the current spare memory space and a size of the space in which data is not stored in the available memory space being less than the size of the recommended spare memory space; and
 allocate another space from which data was deleted in the available memory space as the spare memory space in response to a stored data being deleted from the available memory space.

18. The apparatus of claim 15, wherein the adjustment node is configured to, with respect to a storage node among the storage nodes:
 move data stored in a part of an available memory space to another storage node in response to a sum of the size of the current spare memory space and a size of a space in which data is not stored in the available memory space being less than the size of the recommended spare memory space; and
 allocate the part of the available memory space from which the data was moved as the spare memory space.

19. An apparatus comprising:
a processor configured to
 determine a size of a spare memory of a storage node based on a state of one or more storage nodes using the following equation:

$$f = \frac{\sum_{i=1}^{n} \text{Latency}_i}{n} \quad (2)$$

where $\text{Latency}_i$ denotes a function of latency time and is inversely proportional to a spare factor $S_i$ denotes a spare factor of the i-th storage node, f denotes an objective function and n denotes a number of the storage nodes, and adjust a current size of the spare memory based on the determined size.

20. The apparatus of claim 19, wherein the processor is configured to:
 allocate a part of an available memory of the storage node in which data is not stored to the spare memory in response to the current size being less than the determined size; and
 allocate a part of the spare memory to the available memory in response to the current size being greater than the determined size.

\* \* \* \* \*